United States Patent Office 2,812,263
Patented Nov. 5, 1957

2,812,263

POLISH

Henry C. Geen, Grand Rapids, and James D. Quist, Holland, Mich., assignors, by mesne assignments, of one-half to S. C. Johnson & Son, Inc., a corporation of Wisconsin, and one-half to Simoniz Company, a corporation of Delaware No Drawing. Application March 10, 1949, Serial No. 80,782

7 Claims. (Cl. 106—10)

This invention relates to improvements in finishes for painted, lacquered or varnished surfaces and particularly to a polish for such surfaces.

It is one object of the present invention to provide a surface finish for preserving painted, lacquered or varnished coatings and for enhancing the appearance thereof.

Another object of the invention is to provide a polish for coated surfaces, which can be applied to the surfaces without special attention to uniformity of application and which will require only a minimum of rubbing to obtain the desired appearance without marks "of application" or smearing during rubbing.

Another object of the invention is to provide a coating for painted, lacquered and varnished surfaces which will allow the use of the polished article substantially immediately after application of the coating, and from which dust, or lint and the like may be completely and easily removed.

Another object of the invention is to provide a surface polish which is clearer, more transparent and more uniform in appearance than prior polishes, particularly when used on rubbed and transparent finishes, which provides a high gloss or light reflectivity, and which has greater permanence in its originally applied condition than heretofore obtainable.

A further object of the invention is to provide a coating for painted, lacquered or varnished articles, which is made from easily obtained ingredients and which will be relatively inexpensive.

Generally, the present composition consists of siloxane fluid together with a wax in paste or solution form. A third material such as one of the resins, may be added to give greater apparent depth and greater loss or light reflectivity than is obtained with either of the first two materials alone. An "anti-creep" or wetting agent may also be added to the composition to facilitate application, and a material may be added for increasing the viscosity or "body" of the composition while allowing the cost thereof to be reduced.

The particular silicone, preferably a fluid dimethyl poly-siloxane, used depends on the other materials used, the final product preferably being a composition having a viscosity varying from a mobile liquid to a soft paste, the viscosity of the siloxane fluid itself being such that the siloxane fluid is non-volatile and non-greasy to the touch. However, a siloxane fluid of 200–1100 centistokes viscosity is preferred as giving a polish of the highest gloss, as being easiest to apply and requiring a minimum of rubbing and as producing the smoothest and most easily cleaned finish. The fluid silicone is preferably used in quantity ranging from 1.0 to 5.0 parts by weight.

The primary gloss or light reflectivity producing materials are waxes which may be either crystalline or amorphous in structure and which may be of animal, mineral or vegetable origin. The particular waxes used and their proportions depend on the desired physical qualities of the applied polish and may be varied within relatively wide limits. The waxes are dissolved or dispersed in suitable solvents which are compatible with the silicone fluid and form therewith a dispersion which separates only to a fractional degree even upon standing at room temperatures for extended periods. It is well known in industries using combinations of waxes and solvents of petroleum origin, that such solvents act to dissolve the waxes only at temperatures at or about the melting point of the waxes and act as vehicles in which the waxes are dispersed at room temperature. Hence, the term "solvent" as used in the present application is to be understood as meaning materials which have a solvent action at one temperature and act as dispersants at another temperature, and that such term should be read as "solvent-dispersant." The waxes now used are ozokerite, paraffin and carnauba, individually or in combinations of any two or of the three. The waxes are blended to obtain the properties desired in the final polish, as is well known.

The waxes must be used with a sufficient quantity of silicone to avoid a haziness or smokiness and grayness in the applied polish. Hence, the ratio of silicone fluid to wax should be approximately in equal parts by weight and such weight is 2½ to 15 parts by weight of the finished polish.

The preferred composition contains silicone in the proportions of 1.0–5.0 parts by weight, a wax in the proportions of 2.5–15 parts by weight, and a solvent for the wax in the proportions of 72.0–120.0 parts by weight, the solvent being entirely miscible with the silicone.

Increased gloss and other characteristics are obtained by the use of a resin which is liquefied or in solution, provided the resin solution is also miscible in the silicone-wax composition. Terpene resins melting at 115° C. to 125° C. are readily soluble in a petroleum solvent, are relatively inert, have high resistance to water and alcohol, are substantially colorless and produce a polish of greater clarity, greater gloss or light reflectivity and greater apparent depth than a polish of silicone-wax alone. Such resins may be used in high proportions relative to the other ingredients of the composition, without imparting stickiness to the polish or increasing the time within which the polished article may be used. In spite of the use of 1.0–1.6 parts by weight of resin, it has been found that the present polish has no material "frictional drag" during the little rubbing required for polishing and that all application marks or streaks are readily eliminated.

Where it is desired that the polish have a slight abrasive action as for removing faded surface portions of automobile finishes, 8–26 parts by weight of silica of diatomaceous origin and of varying particle size, may be suspended in any of the following formulations. Other than the above change, the abrasive polish formulations may follow any of the various examples given, although other and special formulae are also disclosed herein.

One "anti-creeping" or wetting agent is triamylamine, although any one of the liquid chlorinated diphenyls, and hydroabietyl alcohol may be used. It is essential that such agent be completely miscible in the silicone fluid for which reason triamylamine is preferred, the other agents mentioned being totally miscible only when in solution in a solvent compatible with the silicone fluid. Only sufficient of the wetting agent is used to secure wetting of the surfaces to be polished, too much of such agent having the effect of making the polish smear when rubbed and of reducing gloss, depth and clarity otherwise imparted to the finish by the coating. If an insufficient quantity of the wetting agent is used, a blotchy appearance is obtained. It is preferred to use wetting agent in quantities up to 10% of the weight of the non-volatile materials in the final composition.

Any desired solvent may be used which is itself miscible in the siloxane fluid and which is non-injurious to lacquered, painted or varnished surfaces.

Various water insoluble soaps may be used as a dispersion agent and stabilizer such as aluminum stearate or palmitate but the stearate is preferred as being less likely to impart greasiness to the polish. The water insoluble soap acts as a dispersing agent or homogenizer in preventing coagulation of waxes into globules of material size, during manufacture particularly, and stabilizes the dispersion so that the compositions may be stored indefinitely and under substantially any conditions without permanent irreversible separation.

The following examples of particular compositions are given for illustrative purposes only:

Example I (Silicone fluid plus wax plus solvent)

| | Parts by weight |
|---|---|
| Polydimethyl siloxane fluid, 200 to 500 centistokes viscosity at 25° C. (common name, silicone fluid) | 4.0 |
| Petroleum wax, melting point 190 to 195° F., penetration by A. S. T. M. method D5–25 in 1/10 millimeter at 100 grams, 5 seconds 77° F. is 2 to 7, viscosity by A. S. T. M. D88–44 at 210° F. with a Saybolt Standard Universal orifice is 75 to 85 | 3.3 |
| Petroleum naphtha, boiling range of 218° F. to 300° F., closed cup flash point of 36° F., kauri butanol value of 35, aniline point 135° F., specific gravity 0.737 (common name V. M. & P. naphtha) | 92.7 |

The whole is compounded by heating all of the materials together with agitation and refluxing until the wax has melted or is completely and uniformly dispersed in the liquids. The composition is then cooled with agitation to approximately 80° F., at which time the polish is ready to use.

Example II (Silicone fluid plus wax plus solvent and plus resin)

| | Parts by weight |
|---|---|
| Polydimethyl siloxane fluid (viscosity as above) | 4.0 |
| Petroleum wax (properties as above) | 3.3 |
| Petroleum naphtha (properties as above) | 72.0 |
| A terpene hydrocarbon resin, melting points by ball and ring method of 115° C., acid number less than 4, saponification number less than 4, ash less than 0.1% | 1.6 |

All materials are combined and heated with agitation and refluxing until the mixture is homogeneous, and then cooled with agitation to approximately 80° F., at which time the polish is ready to use.

Example III (Silicone fluid plus wax plus solvent plus resin and plus a non-wax as wetting agent)

| | Parts by weight |
|---|---|
| Polydimethyl siloxane fluid (viscosity as above) | 5.0 |
| Petroleum wax, melting point of 150 to 195° F. | 3.3 |
| Petroleum naphtha (properties as above) | 93.4 |
| A terpene hydrocarbon resin (properties as above) | 1.0 |
| Triamylamine | 0.6 |

All materials are combined and heated with agitation and refluxing until the mixture is homogeneous and then cooled with agitation to approximately 80° F., at which time the polish is ready to use.

Example IV (Silicone fluid plus wax plus solvent and plus a water insoluble soap)

| | Parts by weight |
|---|---|
| Polydimethyl siloxane fluid (viscosity as above) | 4.0 |
| Petroleum wax (properties as I) | 3.3 |
| Petroleum naphtha (properties as above) | 91.7 |
| Aluminum monostearate, $Al(OH)_2(C_{18}H_{35}O_2)$ | 1.0 |

Mix the silicone fluid, wax and water insoluble soap with part of the naphtha and heat with agitation. Reflux until mixture is homogeneous, then cool with agitation to approximately 80° F., at which time add the remainder of the naphtha and agitate until the mixture is homogeneous. This mixture, as well as Example V below, is smooth and uniform and does not contain lumps or small agglomerations of waxes as are usually found in liquid wax polishes not containing aluminum stearate or some other water insoluble soap. The aluminum stearate increases the viscosity of the naphtha solution and keeps the wax from agglomerating as it usually does when cooled in naphtha from a temperature above its melting point to a temperature below its melting point. The silicone fluid in the polish essentially nullifies the deleterious effects the aluminum stearate would have if the silicone fluid were not mixed with it.

Example V

A polish having all of the desirable qualities mentioned herein and of relatively low cost can be made by use of the following formula:

(Silicone fluid plus wax plus solvent plus resin and plus a water insoluble soap)

| | Parts by weight |
|---|---|
| Polydimethyl siloxane fluid (viscosity as above) | 4.0 |
| Petroleum wax (properties as I) | 3.3 |
| Hexane ($C_6H_{14}$), boiling point 156.2° F., flash point less than 0° F. | 90.0 |
| A terpene hydrocarbon resin (properties as above) | 1.6 |
| Aluminum monostearate, $Al(OH)_2(C_{18}H_{35}O_2)$ | 1.0 |

Mix all of solid materials and the silicone fluid with a portion of the hexane, then heat and agitate with refluxing until mixture is homogeneous, then cool to approximately 80° F. with agitation, at which time add the remainder of the hexane and agitate until the mixture is homogeneous. The present polish dries very rapidly (less than five minutes), which is an advantage for industrial work particularly. The same formulation can be made in the above prescribed manner but substituting another solvent, such as V. M. & P. naphtha, for the hexane, in which case the polish will not dry as rapidly but is otherwise unchanged.

Example VI

A polish having all of the desirable qualities mentioned herein and of relatively low cost can be made by use of the following formula:

(Silicone fluid plus wax plus solvent plus resin and plus a water insoluble soap)

| | Parts by weight |
|---|---|
| Polydimethyl siloxane fluid, 220 to 350 centistokes viscosity | 4.0 |
| Polydimethyl siloxane fluid, 950 to 1050 centistokes viscosity | 1.0 |
| Carnauba wax, melting point 180 to 187° F. | 3.3 |
| Petroleum naphtha of (properties as above) | 120.0 |
| A terpene resin (properties as above) | 1.6 |
| Aluminum monostearate | 1.8 |

Combine all of the materials with half of the total amount of naphtha, heat and reflux with agitation until the mixture is homogeneous and all solid materials have dispersed or dissolved, then cool with agitation. When at room temperature add the balance of the naphtha and mix until homogeneous. The initial appearance of this polish is jelly-like with large gelled particles in it. After standing for several days at room temperature the mixture becomes smooth and fluid upon agitation, and will remain in this condition.

Examples V and VI with their resin and aluminum stearate content, contrary to expectations, are just as easy to apply and require substantially no more rubbing than the silicone-wax composition alone. A clear finish of great apparent depth is obtained with a high gloss and of extreme smoothness. In such examples, the wax content also functions as a wetting agent and none of the wetting agents above mentioned need be used. The wax also minimizes penetration of the polish into the finish of the article thus avoiding damage to the finish itself even when such finish is "crazed."

In the use of the present polishes, it is desirable that the varnished, lacquered, painted or uncoated surface be washed with soap and water or wiped with some solvent to make certain that the surface is free from prior polishes, grease and loose particles and that it otherwise presents a clean surface. It has been found that the present compositions spread easily and uniformly, dry quickly and require little rubbing to bring out gloss. A highly reflective surface, with either mirror-like or light diffusing surface dependent on the composition used, is obtained and does not retain dust, lint, etc. so that the article may be easily kept clean. The present polishes present a better "feel" than prior polishes, which is believed to be due to the dry or non-greasy but smooth surface obtained. The clarity and gloss of the polished surface is retained for a longer time than with other polishes and is more readily restored by very light applications of the present compositions. The apparent depth of the finish is intensified and, if the article has an ornamental grain, the appearance of the grain is enhanced. The finish is highly resistant to spotting by liquids, and to abrasion, is substantially unaffected by heat from the usual heating appliances, and by sunlight. The dried finish is essentially non-flammable.

It will be understood that the present compositions may include a dye stain or pigment for use in finishing raw wood or for re-finishing articles which have been gouged or scratched sufficiently to expose the surface of the wood.

For use where minute portions of a surface coating are to be removed prior to or during the polishing operation, as is the case with automobile finishes in which the pigments in the surface are faded, polishes of the following composition may be used:

*Example VII*

|  | Parts by weight |
|---|---|
| Example VI | 100 |
| Powdered silica | 12 |

The silica is of diatomaceous origin, free from grit and from 1 to 4 microns average particle size as determined by the Oden method. The typical chemical analysis is as follows:

| Composition: | Percent by weight |
|---|---|
| Loss on ignition | 3.0 |
| $SiO_2$ | 89.4 |
| $Al_2O_3$ | 4.1 |
| $Fe_2O_3$ | 1.5 |
| $TiO_2$ | 0.1 |
| CaO | 0.2 |
| MgO | 0.7 |
| $Na_2O(+K_2O)$ | 0.8 |
| Total | 99.8 |

The polish is made by adding the diatomaceous silica to Example VI and stirring until homogeneous. It should be understood that part or all of the petroleum naphtha in Example VI can be replaced with mineral spirits of petroleum origin having a flash point of 103° F., which would cause the polish to dry more slowly but otherwise would have substantially no effect on it.

Another polish and cleaner for automobiles which contains more abrasive material than Example VII is as follows:

*Example VIII*

(Silicone fluid plus wax plus solvents plus resin and plus silica)

|  | Parts by weight |
|---|---|
| Polydimethyl siloxane fluid, 950 to 1050 centistokes viscosity | 5.0 |
| Carnauba wax | 3.3 |
| Petroleum naphtha, 36° F. flash point by closed cup method | 60 |
| Petroleum naphtha, 103° F. flash point by closed cup method | 60 |
| A terpene resin | 1.6 |
| Silica, 1 to 2 microns average particle size | 26 |

Combine all solid materials except the silica with the silicone fluid and the lower-flash petroleum naphtha and heat and reflux with agitation until the mixture is homogeneous and contains no lumps of undispersed material, then cool with agitation to room temperature. Add the high-flash petroleum naphtha and mix until homogeneous, then add all of the silica and mix until homogeneous. It will be understood that coal tar naphtha or other aromatic and relatively inexpensive solvents may be used in place of all or part of the high-flash aliphatic hydrocarbon shown in the formula.

Still another method of making a car polish consists of emulsifying a polish such as Example V in water by means of an emulsifying agent such as an alkylated aryl poly-ether alcohol, in which case the water contains all of the wetting agent and silica to be used and the polish is heated and added to the water with rapid agitation. This yields a polish with the silica in the water phase and the polish in the oil phase of an oil-in-water emulsion. An example is as follows:

*Example IX*

|  | Parts by weight |
|---|---|
| Example V | 50 |
| Diatomaceous silica | 14 |
| Water | 34 |
| An alkylated aryl poly-ether alcohol | 2 |

Heat Example V to 160° in a separate container from the rest of the ingredients, heat the water, silica and emulsifying agent mixture to 160° F. in its container, then add Example V to the water mixture of the other ingredients with rapid agitation and continue to agitate while cooling to room temperature.

It has been found that any one of Examples VII, VIII or IX may be used as a combined cleaner and polish as for automobiles, and will produce an entirely satisfactory finish in a single operation rather than requiring separate cleaning and polishing steps as is the case with preparations now on the market. However, if the use of any one of our silica-containing polishes is followed by the use of any of our non-abrasive polishes, the color and luster of the finish are enhanced to a degree not now obtainable with known automobile polishes and such finish is even better than when only one of our non-abrasive polishes is used.

Comparative tests of the present automobile polishes and materials now on the market were performed by treating adjacent comparative areas on automobiles with the separate cleaner and polishes now on the market and by the separate use of our abrasive and non-abrasive polishes. The areas treated with either of our abrasive polishes or with both our abrasive and non-abrasive polishes, show greater depth of color and luster and a greater permanence of finish than is otherwise obtainable.

In the present application, the phrase "parts by weight" means the relative proportional weight of the recited constituents of the composition, regardless of added or optional or inert constituents.

We claim:

1. A film forming protective composition consisting essentially of naphtha, wax, and a liquid dimethyl polysiloxane having a viscosity within a range of from 200–400 centistokes at 25° C., said dimethylpolysiloxane being present in a quantity by weight of from one part of weight of dimethyl-polysiloxane per four parts of wax, to two parts by weight of dimethyl-polysiloxane per one part by weight of wax, the major portion by weight of the composition consisting of said naphtha.

2. A polish composition adapted to produce a surface protecting coating of high gloss, consisting essentially of: a wax; a hydrocarbon solvent; and a liquid dialkylsiloxane having a viscosity not over about 1100 centistokes at 25° C. in an amount of at least 1 part by weight of the dialkylsiloxane per 136 parts by weight of said polishing composition, the ratio of wax and dialkylsiloxane being such as to avoid substantial haziness in the applied polish finish.

3. A polish composition as set forth in claim 2 in which said composition includes water, with the wax, solvent, and dialkylsiloxane dispersed in said water.

4. A polish composition adapted to produce a surface protecting coating of high gloss, consisting essentially of: a wax; a hydrocarbon solvent; and a liquid dimethylsiloxane having a viscosity not over about 1100 centistokes at 25° C. in an amount of at least 1 part by weight of the dimethylsiloxane per 136 parts by weight of said polishing composition, the ratio of wax and dimethylsiloxane being such as to avoid substantial haziness in the applied polish finish.

5. A polish composition adapted to produce a surface protecting coating of high gloss, consisting essentially of: about 2.5–15 parts by weight of wax; about 72.0–120.0 parts by weight of a hydrocarbon solvent; and about 1.0–5.0 parts by weight of a liquid dimethylsiloxane, the ratio of wax and dimethylsiloxane being such as to avoid substantial haziness in the applied polish finish.

6. A polish composition adapted to produce a surface protecting coating of high gloss, consisting essentially of: about 2.5–15 parts by weight of wax; about 72.0–120.0 parts by weight of a hydrocarbon solvent; and about 1.0–5.0 parts by weight of a liquid dimethylsiloxane having a viscosity not over about 1100 centistokes at 25° C., the ratio of wax and dimethylsiloxane being such as to avoid substantial haziness in the applied polish finish.

7. A polish composition as set forth in claim 6 in which said composition includes water, with the wax, solvent, and dimethylsiloxane dispersed in said water.

References Cited in the file of this patent

UNITED STATES PATENTS

| | | |
|---|---|---|
| 2,258,218 | Rochow | Oct. 7, 1941 |
| 2,374,414 | Cartwright | Apr. 24, 1945 |
| 2,383,521 | Sowa | Aug. 28, 1945 |
| 2,392,805 | Biefeld | Jan. 15, 1946 |
| 2,409,683 | Howk et al. | Oct. 22, 1946 |
| 2,527,793 | Bump | Oct. 31, 1950 |
| 2,547,396 | Joanen | Apr. 3, 1951 |
| 2,566,364 | Pedlow et al. | Sept. 4, 1951 |
| 2,584,413 | Baer et al. | Feb. 5, 1952 |

OTHER REFERENCES

Dow Corning Silicone Note Book, Fluid Series #3, pub. Dow Corning Corp., Midland, Mich., pp. 3 and 30, September 1948.

Chemical and Engineering News, Dec. 13, 1948, p. 3734.

DC Antifoam A—Dow Corning Silicone Notebook—Compound Series #1, revised January 1949, Dow Corning Corp., Midland, Mich.

Dedication 2,812,263.—*Henry C. Geen*, Grand Rapids, and *James D. Quist*, Holland, Mich. POLISH. Patent dated Nov. 5, 1957. Dedication filed Dec. 23, 1957, by the assignees, *S. C. Johnson & Son, Inc.* and *Simoniz Company*.

Hereby dedicates to the public the full and unrestricted use of said patent.
[*Official Gazette January 28, 1958.*]